United States Patent
Bai et al.

(10) Patent No.: US 11,288,106 B2
(45) Date of Patent: Mar. 29, 2022

(54) FUNCTION PROMPTING METHOD, FUNCTION PROMPTING APPARATUS, AND STORAGE MEDIUM

(71) Applicant: BEIJING XIAOMI MOBILE SOFTWARE CO., LTD., Beijing (CN)

(72) Inventors: Dongshu Bai, Beijing (CN); Guanzhi Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/938,946

(22) Filed: Jul. 25, 2020

(65) Prior Publication Data
US 2021/0248020 A1 Aug. 12, 2021

(30) Foreign Application Priority Data
Feb. 7, 2020 (CN) .......... 202010082943.9

(51) Int. Cl.
*G06F 9/54* (2006.01)
*G06F 3/0481* (2022.01)
*G06F 8/65* (2018.01)
*H04L 67/55* (2022.01)

(52) U.S. Cl.
CPC .......... *G06F 9/542* (2013.01); *G06F 3/0481* (2013.01); *G06F 8/65* (2013.01); *H04L 67/26* (2013.01)

(58) Field of Classification Search
None
See application file for complete search history.

(56) References Cited

U.S. PATENT DOCUMENTS

| 2015/0371040 A1 | 12/2015 | Ding et al. |
| 2019/0014205 A1* | 1/2019 | Miloseski |
| 2020/0065319 A1 | 2/2020 | Zu et al. |

FOREIGN PATENT DOCUMENTS

CN 109684443 A 4/2019

OTHER PUBLICATIONS

Ajit Singh, 3 unique push notification use-cases to automate customer feedback, May 29, 2017, pp. 1-15 (Year: 2017).*
Extended European Search Report in U.S. Appl. No. 20/190,966, dated Jan. 27, 2021.

* cited by examiner

*Primary Examiner* — Syed A Roni
(74) *Attorney, Agent, or Firm* — Syncoda LLC; Feng Ma

(57) ABSTRACT

A function prompting method can be applied to a terminal, and include: acquiring a new function to be prompted in the terminal, acquiring a predetermined condition to be met for prompting the new function; and trigging a predetermined first application invoking notification bar to push the new function when the predetermined condition is met.

16 Claims, 4 Drawing Sheets

FUNCTION PROMPTING METHOD, FUNCTION PROMPTING APPARATUS, AND STORAGE MEDIUM

CROSS-REFERENCE TO RELATED APPLICATION

This application claims priority to Chinese Patent Application No. 202010082943.9 filed on Feb. 7, 2020, the disclosure of which is hereby incorporated by reference in its entirety.

BACKGROUND

With the functions of smart terminals becoming more and more abundant, there are more and more types of applications installed on the smart terminals.

In order to improve user experience, during the use of terminals by users, the terminal manufacturer upgrades the terminal not periodically, and thus some new functions that are beneficial to the user may be added.

SUMMARY

The present disclosure generally relates to the field of terminal technologies, and more specifically, to a function prompting method, a function prompting apparatus, and a storage medium.

According to a first aspect of embodiments of the present disclosure, there is provided a function prompting method, the function prompting method is applied to a terminal, and the function prompting method includes: acquiring a new function to be prompted in the terminal, and acquiring a predetermined condition to be met for prompting the new function; and trigging a predetermined first application invoking notification bar to push the new function when the predetermined condition is met.

In some embodiments, the trigging a predetermined first application invoking notification bar to push the new function includes:

acquiring description information of the new function; configuring the description information of the new function into the first application; and trigging the first application invoking notification bar to push a first application configured with description information of the new function.

In some examples, the acquiring a predetermined condition to be met for prompting the new function includes: calling a predetermined second application; and identifying, through the second application, information of triggering push of the new function.

In some embodiments, the acquiring description information of the new function includes: performing global broadcast of the description information of the new function according to a predetermined protocol through the second application; and receiving global broadcast of the second application through the first application, and parsing the global broadcast to obtain the description information of the new function.

In some embodiments, the function prompting method further includes: jumping to a page link corresponding to the new function when an instruction to display the new function is received, based on the new function pushed in a notification bar.

In some embodiments, the description information of the new function includes: a title and a summary of the new function.

According to a second aspect of embodiments of the present disclosure, there is provided a function prompting apparatus, the function prompting apparatus is applied to a terminal, and the function prompting apparatus includes:

an acquiring component configured to acquire a new function to be prompted in the terminal, and to acquire a predetermined condition to be met for prompting the new function; and a processing component configured to trigger a predetermined first application invoking notification bar to push the new function when the predetermined condition is met.

In some embodiments, the acquiring component is further configured to: acquire description information of the new function; and the processing component triggers a predetermined first application invoking notification bar to push the new function by: configuring the description information of the new function into the first application; and trigging the first application invoking notification bar to push a first application configured with the description information of the new function.

In some embodiments, the acquiring component acquires a predetermined condition to be met for prompting the new function by: calling a predetermined second application; and identifying, through the second application, information of triggering push of the new function.

In some embodiments, the acquiring component acquires description information of the new function by: performing global broadcast of the description information of the new function according to a predetermined protocol, through the second application; and receiving global broadcast of the second application through the first application, and parsing the global broadcast to obtain description information of the new function.

In some embodiments, the processing component is further configured to: jump to a page link corresponding to the new function when an instruction to display the new function is received, based on the new function pushed in a notification bar.

In some embodiments, the description information of the new function includes: a title and a summary of the new function.

According to a third aspect of the present disclosure, there is provided a function prompting apparatus, the function prompting apparatus includes: a memory configured to store instructions; and a processor configured to invoke instructions to execute the function prompting method according to the above-described first aspect or any one example of the first aspect.

According to a fourth aspect of the present disclosure, there is provided a non-transitory computer-readable storage medium, computer-executable instructions are stored in the non-transitory computer-readable storage medium, and when the computer-executable instructions are executed by a processor, the function prompting method according to the above-described first aspect or any one example of the first aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodi

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

At present, it often happens that new functions are put on hold and not used.

Various embodiments of the present disclosure can address how to guide users to use the new functions and improve the user's experience on the terminal.

Various embodiments of the present disclosure can be applied to application scenarios of prompting functions on the terminal. In the exemplary embodiments described below, the terminal is also referred to as an smart terminal device in some cases, wherein the terminal can be a mobile terminal, and can also be referred to as user equipment (UE), a mobile station (MS), and the like. The terminal is a device for providing voice and/or data connection to the user, or a chip provided in the device, for example, a hand-held device with a wireless connection function, a vehicle-mounted device, and the like. For example, the terminal can include: mobile phones, tablet computers, notebook computers, handheld computers, mobile internet devices MID), wearable devices, virtual reality (VR) devices, augmented reality (AR) devices, wireless terminals in industrial control, wireless terminals in unmanned driving, wireless terminals in remote surgery, wireless terminals in smart grids, wireless terminals in transportation safety, wireless terminals in smart cities, and wireless terminals in smart homes, and the like.

Figure 1:
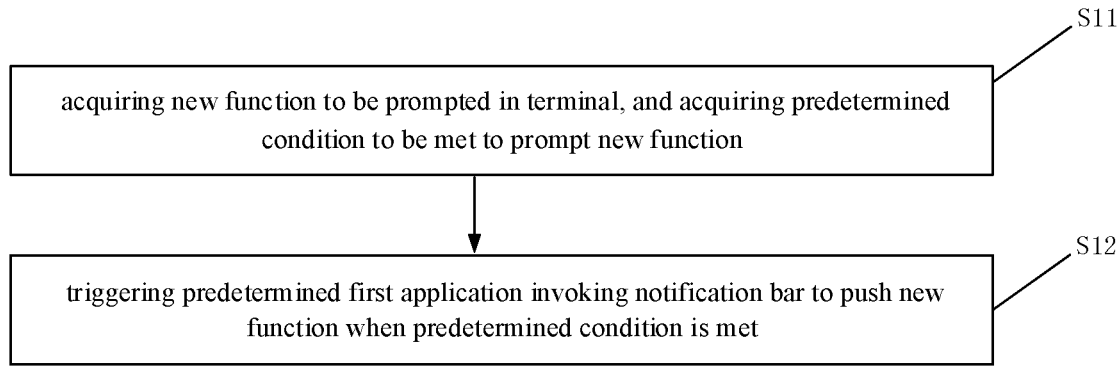
- FIG. 1 is a first flowchart illustrating a function prompting method according to some embodiments.

FIG. 1 is a flowchart illustrating a function prompting method according to some embodiments, and as shown in FIG. 1, the function prompting method is used in a terminal and includes the following steps.

In step S11, a new function to be prompted in the terminal is acquired, and a predetermined condition to be met for prompting the new function is acquired.

In the present disclosure, the new function that needs to be prompted in the terminal can be a new application installed on the terminal by the terminal manufacturer, and can also be a function added newly in the application installed on the terminal by the terminal manufacturer.

The predetermined condition to be met for prompting the new function involved in the disclosure may be a condition that can trigger the push of the new function. The predetermined condition that needs to be met for prompting the new function corresponds to the new function. In other words, each new function corresponds to the predetermined condition that needs to be met for prompting the new function.

In step S12, a predetermined first application invoking notification bar is triggered to push the new function when the predetermined condition is met.

In order to ensure the uniformity and maintainability of the push logic when new functions are pushed, predetermined applications can be used to invoke the notification bar uniformly through an invoking entrance of the predetermined applications to push the new functions, so as to facilitate the subsequent management of the new functions and the capacity expansion of the new functions. In the present disclosure, for convenience of description, an application that invokes a notification bar to push a new function is referred to as a first application.

In an implementation, after acquiring the new function to be prompted in the terminal and acquiring the predetermined condition to be met for prompting the new function, it is determined whether the current terminal meets the predetermined condition, and when the predetermined condition is met, the predetermined first application invoking notification bar is triggered to push the new function.

In some embodiments of the present disclosure, a new function to be prompted in the terminal is acquired and a predetermined condition to be met for prompting the new function is acquired, and the push of the new function is triggered by satisfying the preset conditions required to prompt the new function, such that the new function required by the user can be pushed accurately and timely, and then the user can be well guided to use the new functions and the user experience is improved.

Figure 2:
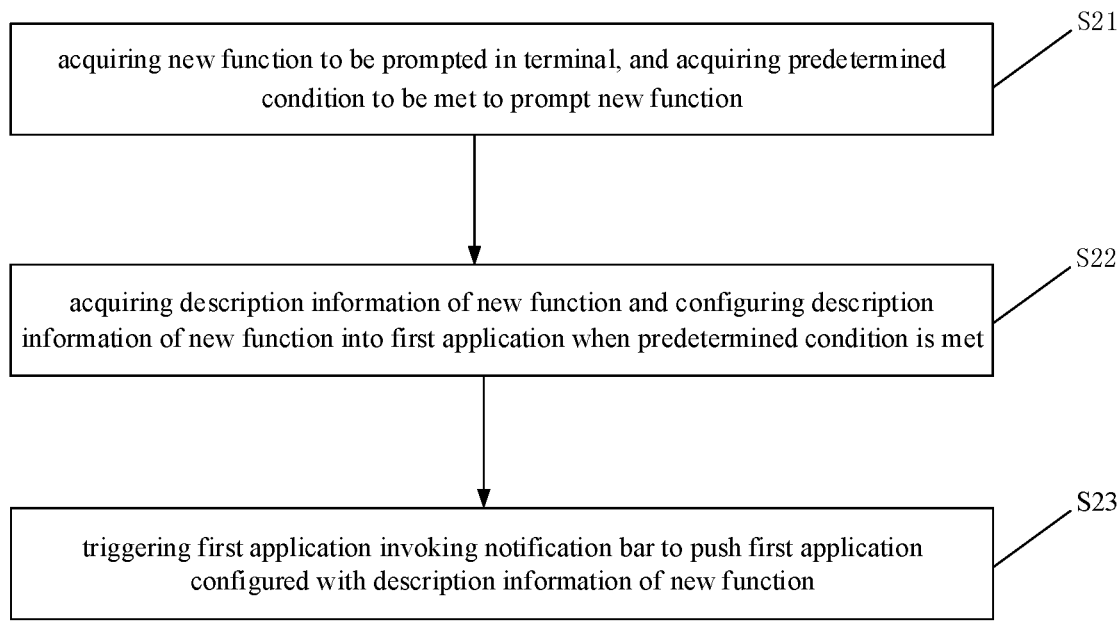
FIG. 2 is a second flowchart illustrating a function prompting method according to some embodiments.

FIG. 2 is a flowchart illustrating a function prompting method according to some embodiments, and as shown in FIG. 2, the function prompting method is used in a terminal and includes the following steps.

In step S21, a new function to be prompted in the terminal is acquired, and a predetermined condition to be met for prompting the new function is acquired.

In step S22, description information of the new function is acquired and the description information of the new function is configured into the first application when the predetermined condition is met.

In the present disclosure, the description information of the new function includes but is not limited to the information of the title of the new function and the summary of the new function.

In the present disclosure, in order to enable the first application to undertake the push of various types of new functions, and to facilitate the subsequent maintenance and expansion of the new functions, the application that introduces the functions of the terminal installed on the terminal can be used, and the new function is pushed through the application that introduces the functions of the terminal.

Herein, when the application that introduces the functions of the terminal is used to push the new function, the description information of the new function needs to be configured into the application that introduces the functions of the terminal, that is, the first application. After the description information of the new function is configured into the first application, the first application invoking notification bar can be triggered to push the first application configured with the description information of the new function. Therefore, after acquiring the new functions to be prompted in the terminal and acquiring the predetermined condition to be met for prompting the new function, it is determined whether the current terminal meets the predetermined condition, and when the predetermined condition is met, the description information of the pushed new function is obtained, and the description information of the new function is configured into the first application.

For example, the new function to be prompted in the terminal is a translation function, and the predetermined condition to be met for prompting the new function is that a time zone of the terminal changes. As such, the technical solutions based on the embodiments of the present disclosure will detect the time zone of the terminal, and acquire the description information of the translation function in the terminal when it is determined that the time zone of the terminal changes, and configure the description information of the translation function into the first application in a static registration manner.

In step S23, the first application invoking notification bar is triggered to push a first application configured with description information of the new function.

In some embodiments of the present disclosure, after configuring the description information of the new function into the first application, the first application invoking notification bar can be triggered to push the first application configured with the description information of the new function.

For example, in the example where the above-described new function is the translation function, after the description information of the translation function is configured into the first application in a static registration manner, the first application can be triggered, through the first application invoking notification bar, to push the first application configured with the description information of the new function.

In some embodiments of the present disclosure, the new function to be prompted in the terminal is acquired and the predetermined condition to be met for prompting the new function is acquired, and when the predetermined condition is met, the uniformity and maintainability of the push logic of the new function can be ensured by acquiring the description information of the new function, and configuring the description information of the new function into the first application. Through pushing first application configured with the description information of the new function by trigging the first application invoking notification bar, the new functions required by the user can be pushed accurately and timely.

Hereinafter, detailed description will be given by taking the terminal being a mobile phone as an example in combination with practical applications.

Figure 3:
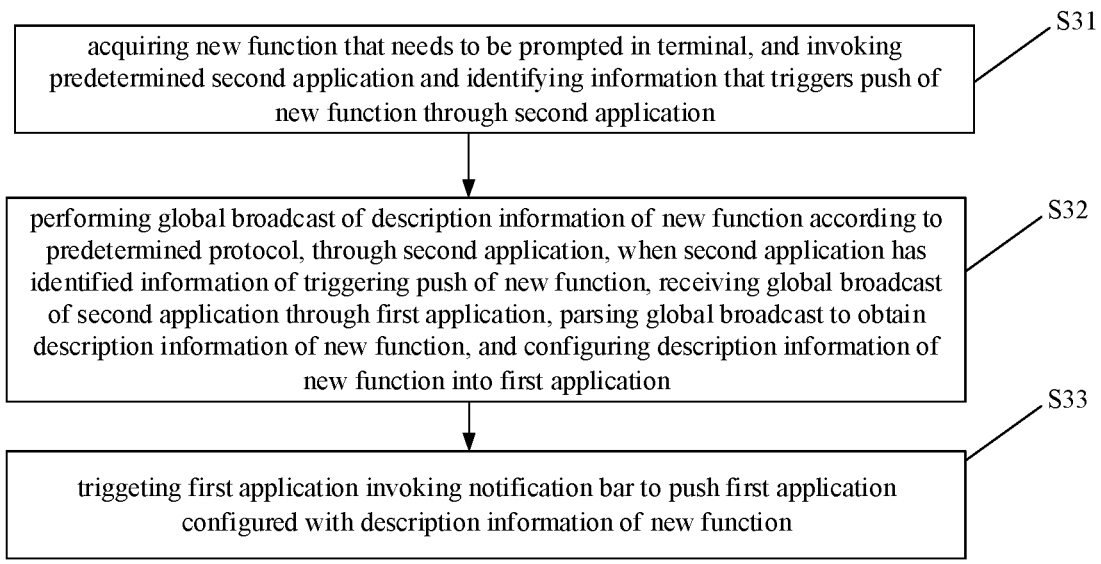
FIG. 3 is a third flowchart illustrating a function prompting method according to some embodiments.

FIG. 3 is a flowchart illustrating a function prompting method according to some embodiments, and as shown in FIG. 3, the function prompting method is used in a terminal and includes the following steps.

In step S31, a new function to be prompted in the terminal is acquired, and a predetermined second application is invoked and information of triggering the push of the new function is identified through the second application.

At present, the terminal manufacturer may add some new applications not periodically while upgrading and optimizing terminals. When the predetermined condition to be met for prompting the new application is established, because the new application has not been used, that is, the new application has not be authorized by the user, the new application cannot identify that the predetermined condition for prompting the new application is met, therefore, in an implementation, a second application that can identify and trigger the push of the new application information needs to be invoked, and the second application is used to identify and trigger the push of the new application information. In the present disclosure, in order to distinguish from the first application, the application that identifies and triggers the push of the new application information is referred to as a second application.

In the present disclosure, the predetermined condition to be met for prompting the new function can be that the predetermined second application has identified the information of triggering the push of the new function. For example, the new function to be prompted in the terminal is a smart travel application, and the predetermined condition to be met for prompting the new function is that a short message application has identified that the short message contains travel-related short message.

In step S32, global broadcast of description information of the new function is performed according to a predetermined protocol, through the second application, when the second application has identified the information of triggering the push of the new function, the global broadcast of the second application is received through the first application, the global broadcast is parsed to obtain the description information of the new function, and the description information of the new function is configured into the first application.

In an implementation, in order to ensure that the first application can receive the description information of the new function, the second application performs the global broadcast of description information of the new function according to the predetermined protocol when the second application has identified the information of triggering the push of the new function.

Herein, the descriptive information of the new function of the global broadcast can be assembled in the form of parameters and the descriptive information of the new function is basically configured. The descriptive information of the new functions assembled in the form of parameters and the basic configuration can be shown in Table 1, as an example.

TABLE 1

| Parameter Name | Effect | Type |
| --- | --- | --- |
| intent_extra_key_content | Summary of the Notification Bar | String |
| intent_extra_key_flag | Jump Way of the New Function<br>1. Jump to the specified card page (scrollable)<br>2. Jump to the specified function page (scrollable)<br>3. Jump to the specified function page (non-scrollable) | String |

TABLE 1-continued

| Parameter Name | Effect | Type |
| --- | --- | --- |
| intent_extra_key_is_to_main | Whether or not to return to the home page when returning | Boolean (Default is true) |
| intent_extra_key_label | As a unique identifier for local cache & server request data | String |
| intent_extra_key_title | Title of the Notification Bar | String |

It can be seen from Table 1 that the description information of the new function assembled in the form of parameters and configured basically can include a title of the new function, a summary of the new function, a way to open the link to the new function, and an identifier of the new function.

Herein, in order to ensure that the first application receives the description information of the new function in time, the priority of the global broadcast of the description information of the new function is raised to the highest, for example, it can be set as android:priority="999", such that the priority of the global broadcast of the description information of the new function is raised to the highest. In addition, in order for the first application to accurately receive the global broadcast of pushing the new function, when the second application performs the global broadcast of the description information of the new function, the identifier used for the notification bar scene may also be broadcast globally, for example, action:com.miui.miservice.MISERVICE_NOTIFICATION.

After receiving the global broadcast of the second application, the first application parses the global broadcast, that is, parses the parameters of the description information of the new function in the global broadcast to obtain the description information of the new function, and configures the description information of the new function into the first application.

In an implementation, since the service and feedback applications in the mobile phone undertake the function introduction part in the mobile phone, the first application can be, for example, a service and feedback application, and a notification bar is invoked through the service and feedback application to push the new function.

In the example where the new function is the smart travel application, the predetermined condition to be met for prompting the new function is that the short message application has identified that the short message contains travel-related short message. The technical solution based on the embodiments of the present disclosure will invoke the short message application, and when the type of the short message is identified by the short message application that the short message contains travel-related short messages, the global broadcast of the description information of the smart travel application is performed according to a predetermined protocol, through the short message application, the global broadcast of the short message application is received through the service and feedback application, the global broadcast is parsed to obtain the description information of the smart travel application, and the description information of the smart travel application is configured into the service and feedback application.

In step S33, the first application invoking notification bar is triggered to push a first application configured with description information of the new function.

In some embodiments of the present disclosure, a new function to be prompted in the terminal is acquired, and a predetermined second application is invoked to identify the information of triggering the push of the new function through the second application. When the second application has identified the information of triggering the push of the new function, the second application performs global broadcast of the description information of the new function according to a predetermined protocol, thereby enabling the first application to receive the description information of the new function in time.

Figure 4:
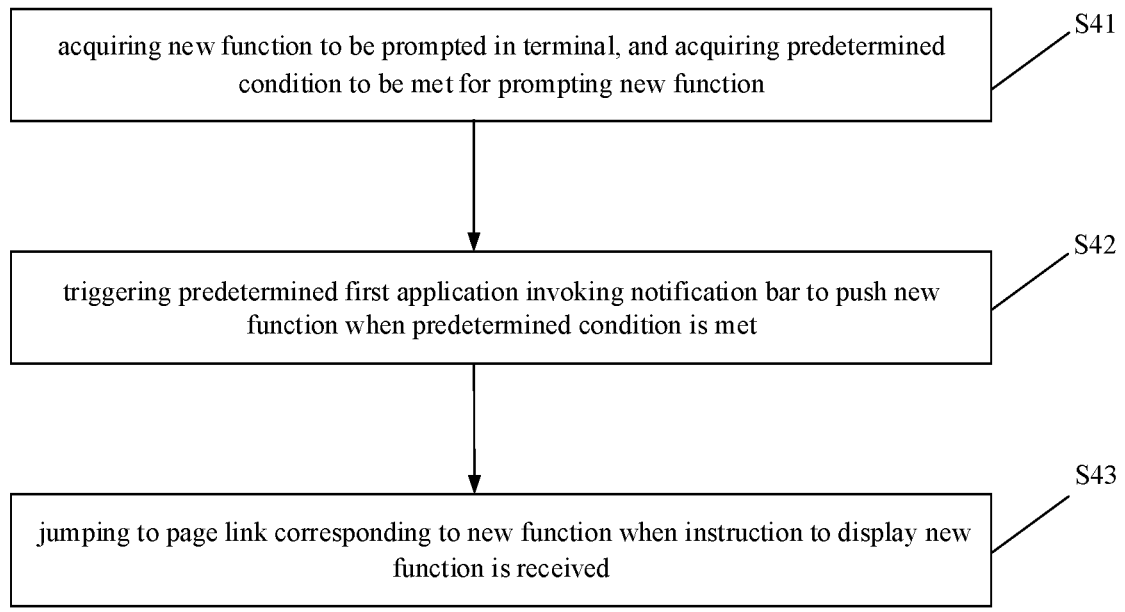
FIG. 4 is a fourth flowchart illustrating a function prompting method according to some embodiments.

FIG. 4 is a flowchart illustrating a function prompting method according to some embodiments, and as shown in FIG. 4, the function prompting method is used in a terminal and includes the following steps.

In step S41, a new function to be prompted in the terminal is acquired, and a predetermined condition to be met for prompting the new function is acquired.

In step S42, a predetermined first application invoking notification bar is triggered to push the new function when the predetermined condition is met.

In step S43, a page link corresponding to the new function is jumped to when an instruction to display the new function is received based on the new function pushed in a notification bar.

In the present disclosure, a preliminary guide to the new function is realized based on the new function pushed in the notification bar, and on the basis of the preliminary display of the new function, when an instruction to display a new function is received, jumping to the page link corresponding to the new function is performed.

Herein, the jumping to a page link corresponding to the new function can include, for example, the display page being scrollable or non-scrollable after opening the link, and whether or not being necessary to return to the home page of the first application. After entering the specific function page according to the jump way of the new function, and when displaying the specific function page, since it is possible to jump to detail page without the consent of the China Testing Alliance (CTA), at this time, it is required to perform a specific logical processing after receiving the consent of the CTA according to the displayed CTA statement pop-up window, otherwise exit directly. After confirming the acceptance of the declaration of consent to the CTA pop-up window, according to the new function identifier, it will be optimized to be queried and displayed from the local database. When the query fails or there is no corresponding record, an interface request should be made to the server. When there is a corresponding record, it will be displayed. When the query fails, it will display a failure state, and when there is no corresponding record, it will directly exit the current page.

The triggering of the notification bar is only a preliminary guide, eventually, it is required to click on the notification bar to enter the corresponding function display as required to provide the user with a convenient chain operation, thereby improving the user experience.

In some embodiments of the present disclosure, based on the new function pushed in the notification bar, the user can easily jump to the page link corresponding to the new function when an instruction to display the new function is received, which is convenient for the user to operate.

Based on the similar inventive concept, the present disclosure further provides a function prompting apparatus. It can be understood that, in order to realize the above-mentioned functions, the function prompting apparatus provided by the embodiments of the present disclosure includes hardware structures and/or software modules corresponding to various functions. With reference to the units and algorithm steps of the examples disclosed in the embodiments of the present disclosure, the embodiments of the present disclosure may be implemented in the form of hardware or a combination of hardware and computer software. Whether a certain function is executed by hardware or in a form that computer software drives hardware depends on the specific application and design constraints of the technical solution. A person skilled in the art may use different methods to implement the described functions for each specific application, but such implementation should not be considered to exceed the scope of the technical solutions of the embodiments of the present disclosure.

Figure 5:
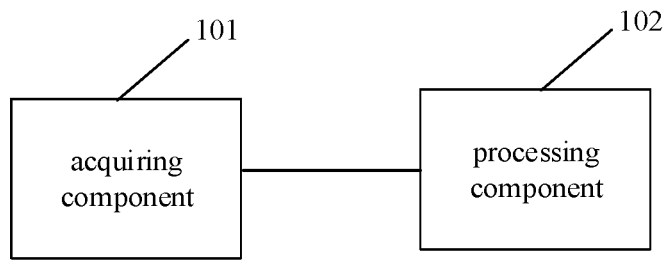
FIG. 5 is a first block diagram illustrating a function prompting apparatus according to some embodiments.

FIG. 5 is a block diagram 100 illustrating a function prompting apparatus according to some embodiments. Referring to FIG. 5, the function prompting apparatus includes an acquiring component 101 and a processing component 102.

The acquiring component 101 is configured to acquire a new function to be prompted in the terminal, and to acquire a predetermined condition to be met for prompting the new function.

The processing component 102 is configured to trigger a predetermined first application invoking notification bar to push the new function when the predetermined condition is met.

In some embodiments, the acquiring component 101 is further configured to acquire description information of the new function; and the processing component 102 triggers the predetermined first application invoking notification bar to push the new function in the following manner: configuring the description information of the new function into the first application; and triggering the first application invoking notification bar to push a first application configured with the description information of the new function.

In some embodiments, the acquiring component 101 acquires a predetermined condition to be met for prompting the new function in the following manner: calling a predetermined second application; and identifying information of triggering the push of the new function through the second application.

In some embodiments, the acquiring component 101 acquires the description information of the new function in the following manner: performing global broadcast of the description information of the new function according to a predetermined protocol through the second application; and receiving global broadcast of the second application through the first application, and parsing the global broadcast to obtain description information of the new function.

In some embodiments, the processing component 102 is further configured to: jump to a page link corresponding to the new function when an instruction to display the new function is received based on the new function pushed in a notification bar.

In some embodiments, the description information of the new function includes: a title and a summary of the new function.

With respect to the apparatuses in the above embodiments, the specific ways for performing operations for individual modules therein have been described in detail in the embodiments regarding the methods, which will not be elaborated herein.

Figure 6:
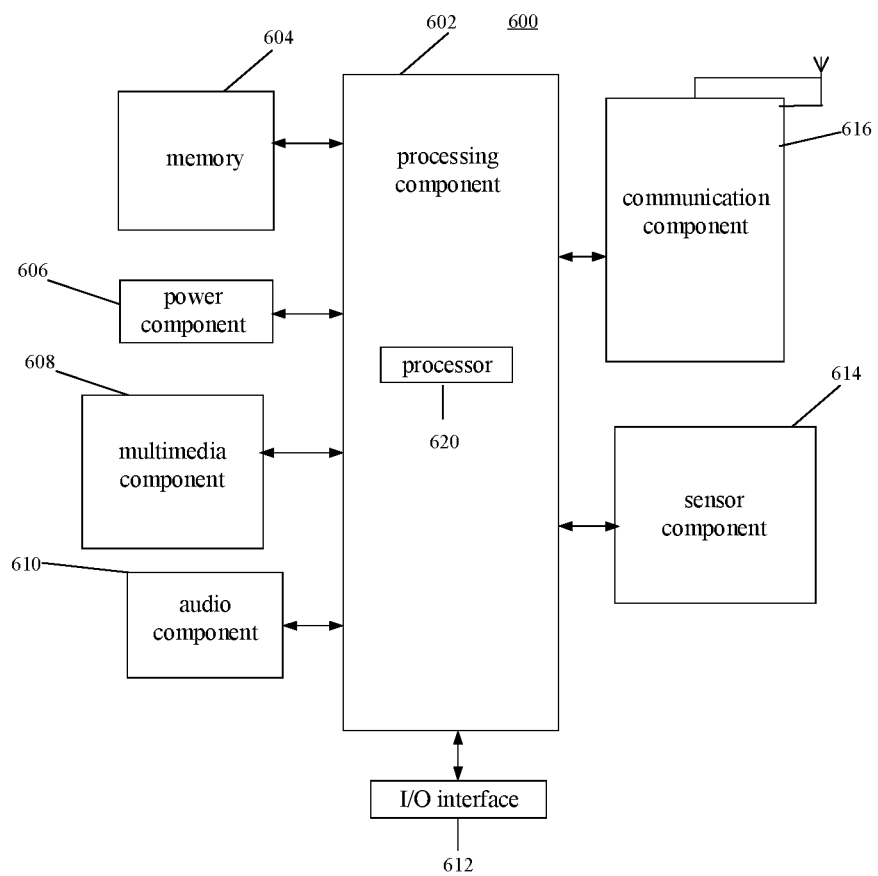
FIG. 6 is a second block diagram illustrating a device according to some embodiments.

FIG. 6 is a block diagram illustrating a device 600 for function prompting, according to some embodiments. For example, the device 600 can be a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to implement all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 supplies power to various components of the device 600. The power component 606 may include a power management system, one or more power sources, and any other components associated with the generation, management, and distribution of power in the device 600.

The multimedia component 608 includes a screen providing an output interface between the device 600 and a user. In some embodiments, the screen may include a liquid crystal display (LCD) and a touch panel (TP). In some embodiments, an organic light-emitting diode (OLED) display or other types of displays can be adopted.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 608 includes a front camera and/or a rear camera. The front camera and/or the rear camera can receive external multimedia data while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal can be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 can detect an on/off status of the device 600, relative positioning of components, e.g., the display and a keypad, of the device 600, the sensor component 614 can also detect a change in position of the device 600 or one component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate wired or wireless communication between the device 600 and other devices. The device 600 can access a wireless network based on a communication standard, such as Wi-Fi, 2G, 3G, 4G, 5G, or a combination thereof. In one exemplary embodiment, the communication component 616 receives a broadcast signal or broadcast associated new functions from an external broadcast management system via a broadcast channel. In one exemplary embodiment, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 604 including the instructions executable by the processor 620 in the device 600, for performing the above-described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have one or more of the following advantages. A new function to be prompted in the terminal is acquired and a predetermined condition to be met for prompting the new function is acquired, and trigging the push of the new function is triggered by meeting the predetermined condition required to prompt the new function, such that the new function required by the user can be pushed accurately and timely, and then the user can be well guided to use the new functions and the user experience is improved.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A function prompting method, applied to a terminal, the method comprising:
    acquiring a new function to be prompted in the terminal, and acquiring a predetermined condition to be met for prompting the new function; and
    trigging a predetermined first application invoking notification bar to push the new function when the predetermined condition is met.

2. The function prompting method according to claim 1, wherein the trigging a predetermined first application to invoke a notification bar to push the new function comprises:
    acquiring description information of the new function;
    configuring the description information of the new function into the first application; and
    trigging the first application invoking notification bar to push a first application configured with description information of the new function.

3. The function prompting method according to claim 2, wherein the acquiring a predetermined condition to be met for prompting the new function comprises:
    invoking a predetermined second application; and
    identifying, through the second application, information of triggering push of the new function.

4. The function prompting method according to claim 3, wherein the acquiring description information of the new function comprises:
    performing global broadcast of the description information of the new function according to a predetermined protocol through the second application; and
    receiving global broadcast of the second application through the first application, and parsing the global broadcast to obtain the description information of the new function.

5. The function prompting method according to claim 2, wherein the description information of the new function comprises:
    a title and a summary of the new function.

6. The function prompting method according to claim 1, further comprising:
    jumping to a page link corresponding to the new function when an instruction to display the new function is received, based on the new function pushed in a notification bar.

7. A mobile terminal implementing the function prompting method according to claim 1, comprising a non-transitory computer-readable storage medium having stored thereon computer-executable instructions for execution by a processing circuit to implement steps of the function prompting method, wherein the mobile terminal further comprises a display screen.

8. The mobile terminal according to claim 7, wherein the trigging a predetermined first application to invoke a notification bar to push the new function comprises:
    acquiring description information of the new function;
    configuring the description information of the new function into the first application; and
    trigging the first application invoking notification bar to push a first application configured with description information of the new function.

9. The mobile terminal according to claim 8, wherein the acquiring a predetermined condition to be met for prompting the new function comprises:
    invoking a predetermined second application; and
    identifying, through the second application, information of triggering push of the new function.

10. The mobile terminal according to claim 9, wherein the acquiring description information of the new function comprises:
    performing global broadcast of the description information of the new function according to a predetermined protocol through the second application; and receiving global broadcast of the second application through the first application, and parsing the global broadcast to obtain the description information of the new function;

wherein the mobile terminal is configured to automatically push the new function as triggered by meeting the predetermined condition, to thereby accurately and timely push the new function to a user and guide the user to use the new function.

11. A function prompting apparatus, applied to a terminal, the apparatus comprising:

a processor; and a memory device storing instructions executable by the processor;

wherein the processor is configured to acquire a new function to be prompted in the terminal, and to acquire a predetermined condition to be met for prompting the new function; and trigger a predetermined first application invoking notification bar to push the new function when the predetermined condition is met.

12. The function prompting apparatus according to claim 11, wherein the processor is further configured to:

acquire description information of the new function; and trigger a predetermined first application invoking notification bar to push the new function by:

configuring the description information of the new function into the first application; and trigging the first application invoking notification bar to push a first application configured with the description information of the new function.

13. The function prompting apparatus according to claim 12, wherein the processor is further configured to acquire a predetermined condition to be met for prompting the new function by:

invoking a predetermined second application; and identifying, through the second application, information of triggering push of the new function.

14. The function prompting apparatus according to claim 13, wherein the processor is further configured to acquire the description information of the new function by:

performing global broadcast of the description information of the new function according to a predetermined protocol, through the second application; and receiving global broadcast of the second application through the first application, and parsing the global broadcast to obtain description information of the new function.

15. The function prompting apparatus according to claim 14, wherein the processor is further configured to:

jump to a page link corresponding to the new function when an instruction to display the new function is received, based on the new function pushed in a notification bar.

16. The function prompting apparatus according to claim 12, wherein the description information of the new function comprises:

a title and a summary of the new function.

* * * * *